(12) United States Patent
Yano

(10) Patent No.: US 6,282,021 B1
(45) Date of Patent: Aug. 28, 2001

(54) VIEWING OPTICAL INSTRUMENT

(75) Inventor: Takaaki Yano, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/540,978

(22) Filed: Mar. 31, 2000

(30) Foreign Application Priority Data

Apr. 2, 1999 (JP) .................................................. 11-096373
Apr. 2, 1999 (JP) .................................................. 11-096374

(51) Int. Cl.$^7$ ............................ G02B 23/00; G02B 27/22
(52) U.S. Cl. ........................ 359/415; 359/407; 359/433; 359/473
(58) Field of Search ..................................... 359/374, 375, 359/376, 377, 383, 384, 407, 412, 413, 415, 433, 473, 480

(56) References Cited

U.S. PATENT DOCUMENTS 4,877,318 * 10/1989 Miles et al. ........................... 359/433
5,073,017 * 12/1991 Suda ..................................... 359/557
5,592,331 * 1/1997 Eastcott .............................. 359/557
5,764,408 * 6/1998 Otaki ................................... 359/368

* cited by examiner

*Primary Examiner*—Cassandra Spyrou
*Assistant Examiner*—Jared Treas
(74) *Attorney, Agent, or Firm*—Greenblum & Bernstein, P.L.C.

(57) ABSTRACT

A viewing optical instrument includes an objective optical system and an eyepiece optical system such that an object image formed through the objective optical system is magnified and observed through the eyepiece optical system. The viewing optical instrument includes an eyepiece adjusting device which allows the eyepiece optical system to rotate relative to the objective optical system about a rotational axis at which an optical axis of the objective optical system intersects a focal plane formed by the objective optical system. A detector detects an inclination of a surface of a sighting object relative to a plane which is normal to the optical axis of the objective optical system, and a controller control the eyepiece optical system to rotate about the rotational axis in accordance with the inclination detected by the detector.

16 Claims, 15 Drawing Sheets

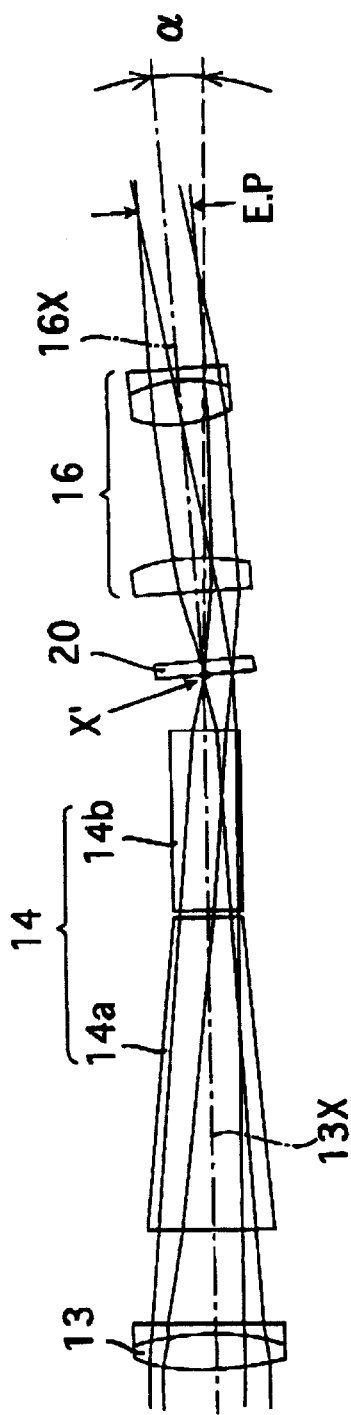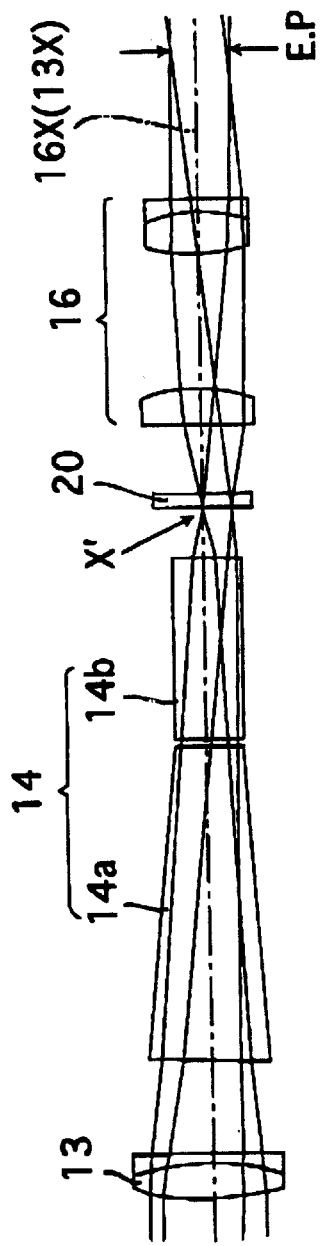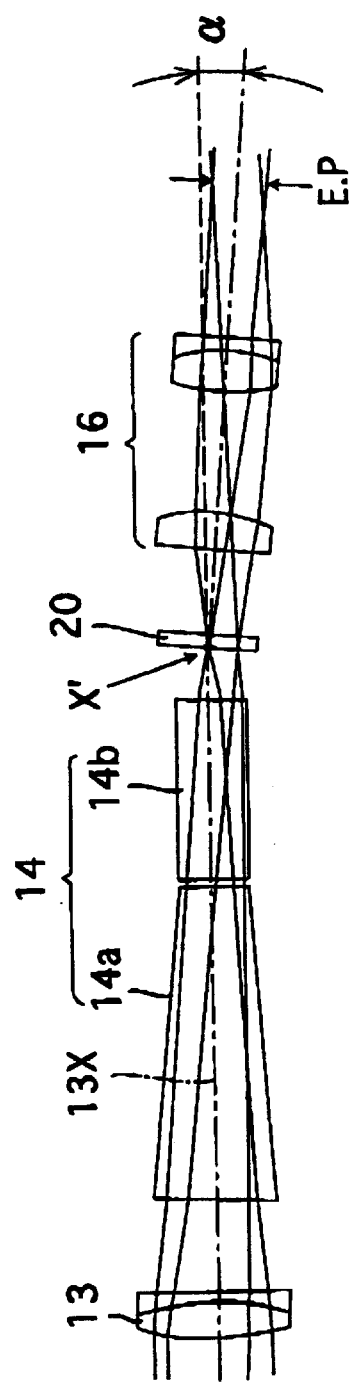

VIEWING OPTICAL INSTRUMENT

BACKGROUND OF THE INVENTION

1. Field of the Invention

The present invention relates to a viewing optical instrument (such as a telescope, a monocular, binocular or field glasses) in which the eyepiece can be brought into focus entirely on a plane which is not normal to the optical axis of the objective optical system.

2. Description of the Related Art

In conventional viewing optical instruments such as telescopes, monoculars, binoculars or field glasses, the eyepiece can be brought into focus entirely on a plane normal to the optical axis of the objective optical system but cannot be brought into focus entirely on a plane other than the normal plane, e.g., a side surface of an object having a wide length which extends at an angle relative to a plane normal to the optical axis of the viewing optical instrument. In such conventional viewing optical instruments, particularly within a short distance range, the eyepiece can be brought into focus only on a small part of a surface if the surface extends at a large angle relative to a plane normal to the optical axis of the objective optical system of the viewing optical instrument, so that the focal point needs to be re-adjusted many times if the user desires to observe the entire large-angled surface. For instance, when the user looks at a wide blackboard with a conventional viewing optical instrument from the right or left front corner in a large auditorium, or when the user monitors a wall in a large square room from any of the four corners of the room, the in-focus area in the field of view will be narrow, which is quite inconvenient.

SUMMARY OF THE INVENTION

An object of the present invention is to provide a viewing optical instrument in which the eyepiece can be swung or tilted to bring the eyepiece into focus entirely on a plane which is not normal to the optical axis of the objective optical system of the viewing optical instrument.

To achieve the object mentioned above, according to an aspect of the present invention, a viewing optical instrument is provided which has an objective optical system and an eyepiece optical system, and an object image formed through the objective optical system is magnified and observed through the eyepiece optical system. The viewing optical instrument includes an eyepiece adjusting device which allows the eyepiece optical system to rotate relative to the objective optical system about a rotational axis at which an optical axis of the objective optical system intersects a focal plane formed by the objective optical system. The viewing instrument which includes a detector detects an inclination of a surface of a sighting object relative to a plane which is normal to the optical axis of the objective optical system, and a controller controls the eyepiece optical system to rotate about the rotational axis in accordance with the inclination detected by the detector.

According to a feature of the present invention, the detector preferably includes at least three AF sensors which respectively correspond to at least three focus detection zones defined in a field of view seen through the eyepiece optical system.

According to a further feature of the present invention, the detector preferably includes at least four AF sensors which respectively correspond to at least four focus detection zones defined in a field of view seen through the eyepiece optical system. The detector detects the inclination in accordance with signals output from three of the at least four AP sensors which respectively correspond to three of the at least four focus detection zones, the three focus detection zones being optionally selected from the at least four focus detection zones.

Preferably, the controller controls the eyepiece optical system to rotate about the rotational axis according to the Scheimpflug principle so that an optical axis of the eyepiece optical system is normal to an image plane, which is inclined relative to a plane which is normal to the optical axis of the objective optical system.

Preferably, according to a feature of the present invention, the viewing optical instrument further includes a tubular body which accommodates the objective optical system therein, an eyepiece holder which accommodates the eyepiece optical system therein, and a mount connected to a rear end of the tubular body to be positioned between the tubular body and the eyepiece holder so that an axis (center) of the mount is coincident with an optical axis of the eyepiece optical system. The mount includes a concave face at the rear end thereof. The eyepiece holder is connected to the concave face of the mount so that the eyepiece holder can be swung or tilted relative to the tubular body.

Preferably, the eyepiece holder includes a spherical surface at a front end of the eyepiece holder, the spherical surface being connected to the concave face of the mount.

Preferably, the viewing optical instrument further includes an erecting optical system positioned between the objective optical system and the eyepiece optical system.

Preferably, the viewing optical instrument is a binocular.

According to another aspect of the present invention, a viewing optical instrument is provided which has an objective optical system and an eyepiece optical system. An object image formed through the objective optical system is magnified and observed through the eyepiece optical system. The viewing optical instrument includes a diffusion plate on which the object image is formed, and an eyepiece adjusting device which allows the eyepiece optical system and the diffusion plate to rotate as a unit relative to the objective optical system about a rotational axis at which the optical axis of the objective optical system intersects a matte surface of the diffusion plate.

Preferably, the center of the diffusion plate lies on both the optical axis of the objective optical system and on the optical axis of the eyepiece optical system.

Preferably, the eyepiece optical system and the diffusion plate can be moved in a direction of the optical axis of the objective optical system.

Preferably, the viewing optical instrument further includes a controller for controlling the eyepiece optical system to rotate about the rotational axis, so that an optical axis of the eyepiece optical system is normal to the image plane which is inclined, according to the Scheimpflug principle, relative to a plane which is normal to the optical axis of the objective optical system.

Preferably, the viewing optical instrument further includes a tubular body which accommodates the objective optical system therein and eyepiece holder which accommodates the eyepiece optical system therein. A mount is connected to a rear end of the tubular body to be positioned between the tubular body and the eyepiece holder so that an axis of the mount is coincident with an optical axis of the eyepiece optical system. The mount includes a concave face at the rear end thereof. The eyepiece holder is connected to the concave face of the mount so that the eyepiece holder can be swung or tilted relative to the tubular body.

Preferably, the eyepiece holder includes a spherical surface at a front end of the eyepiece holder, the spherical surface being connected to the concave face of the mount.

Preferably, the viewing optical instrument further includes an erecting optical system positioned between the objective optical system and the eyepiece optical system.

Preferably, the viewing optical instrument is a binocular.

The present disclosure relates to subject matter contained in Japanese Patent Applications Nos. 11-96373 and 11-96374 (both filed on Apr. 2, 1999) which are expressly incorporated herein by reference their entireties.

BRIEF DESCRIPTION OF THE DRAWINGS

The present invention will be described below in detail with reference to the accompanying drawings in which:

FIGS. 15A, 15B and 15C are developed views of the viewing optical system of the binocular shown in FIG. 11 in different positions.

DESCRIPTION OF THE PREFERRED EMBODIMENTS

Figure 1:
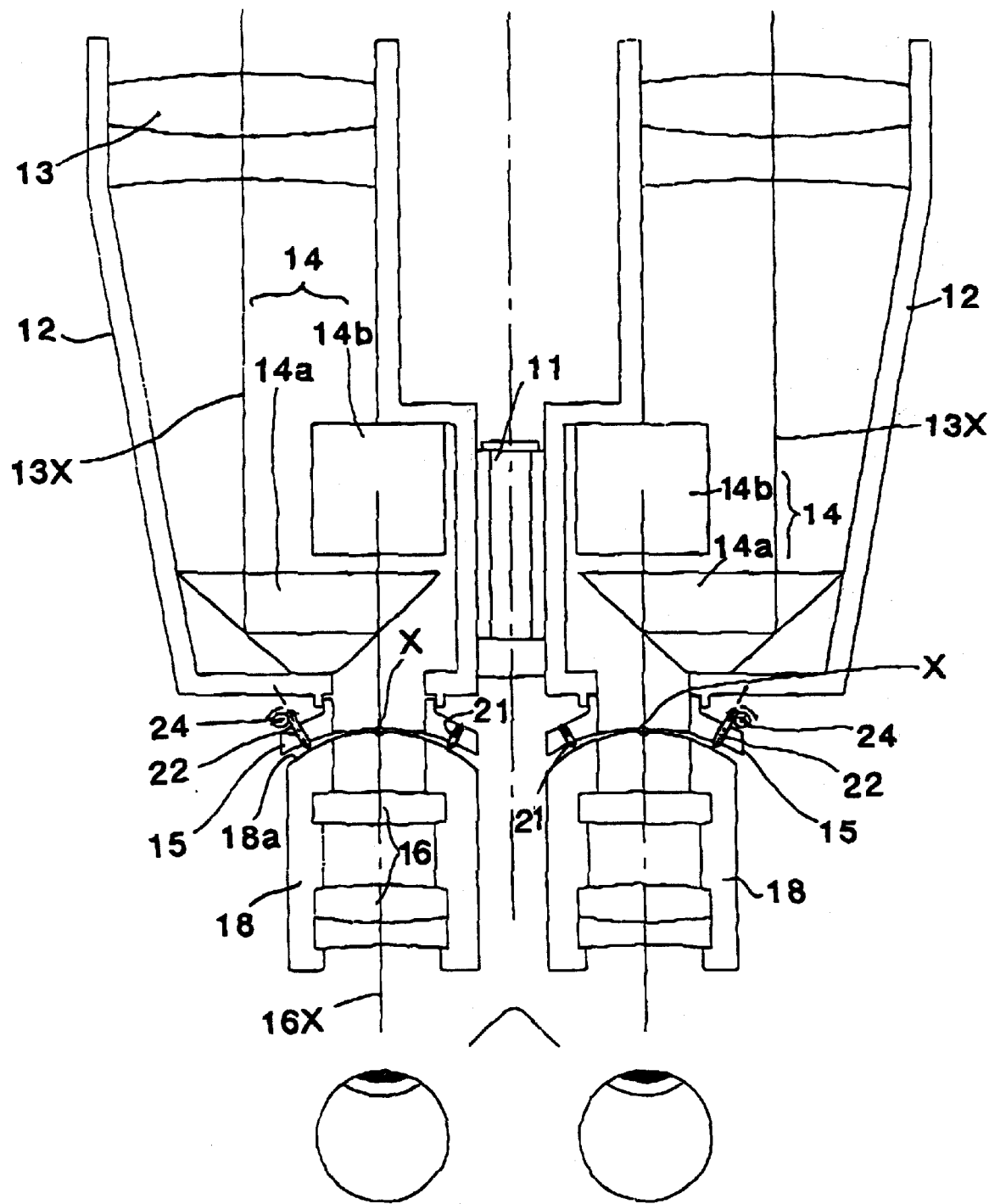
FIG. 1 is a transverse sectional view of the first embodiment of a binocular to which the present invention is applied.

FIGS. 1 through 10 show the first embodiment of a Porro-prism type of binocular (viewing optical instrument) to which the present invention is applied. As shown in FIG. 1, the binocular is provided with a generally bisymmetrical housing body having right and left tubular bodies 12. These right and left tubular bodies 12 are pivoted about a central shaft 11 to be rotatable relative to each other to adjust the distance between the tubular housings to correspond to distance between the right and left eyes of a user. The binocular is provided, in each of the tubular bodies 12, with an objective lens group (objective optical system) 13 and a Porro-prism erecting system 14 which are fixedly positioned therein. The Porro-prism erecting system 14 includes two Porro prisms (two right-angle prisms) 14a and 14b. The optical axis 13X of each objective lens group 13 is parallel to the central shaft 11 and is bent behind the corresponding objective lens group 13 by a corresponding Porro-prism erecting system 14.

A dish-shaped mount 15 is connected to the rear end of each tubular body 12 so that the axis of the dish-shaped mount 15 is coincident with the axis of the objective lens group 13 behind the Porro-prism erecting system 14. An eyepiece holder 18, which holds an eyepiece lens group (eyepiece optical system) 16 therein, is connected to and supported by each of the right and left dish-shaped mounts 15. Each of the right and left viewing optical systems of the binocular includes the objective lens group 13, the Porro-prism erecting system 14 and the eyepiece lens group 16.

Figure 2:
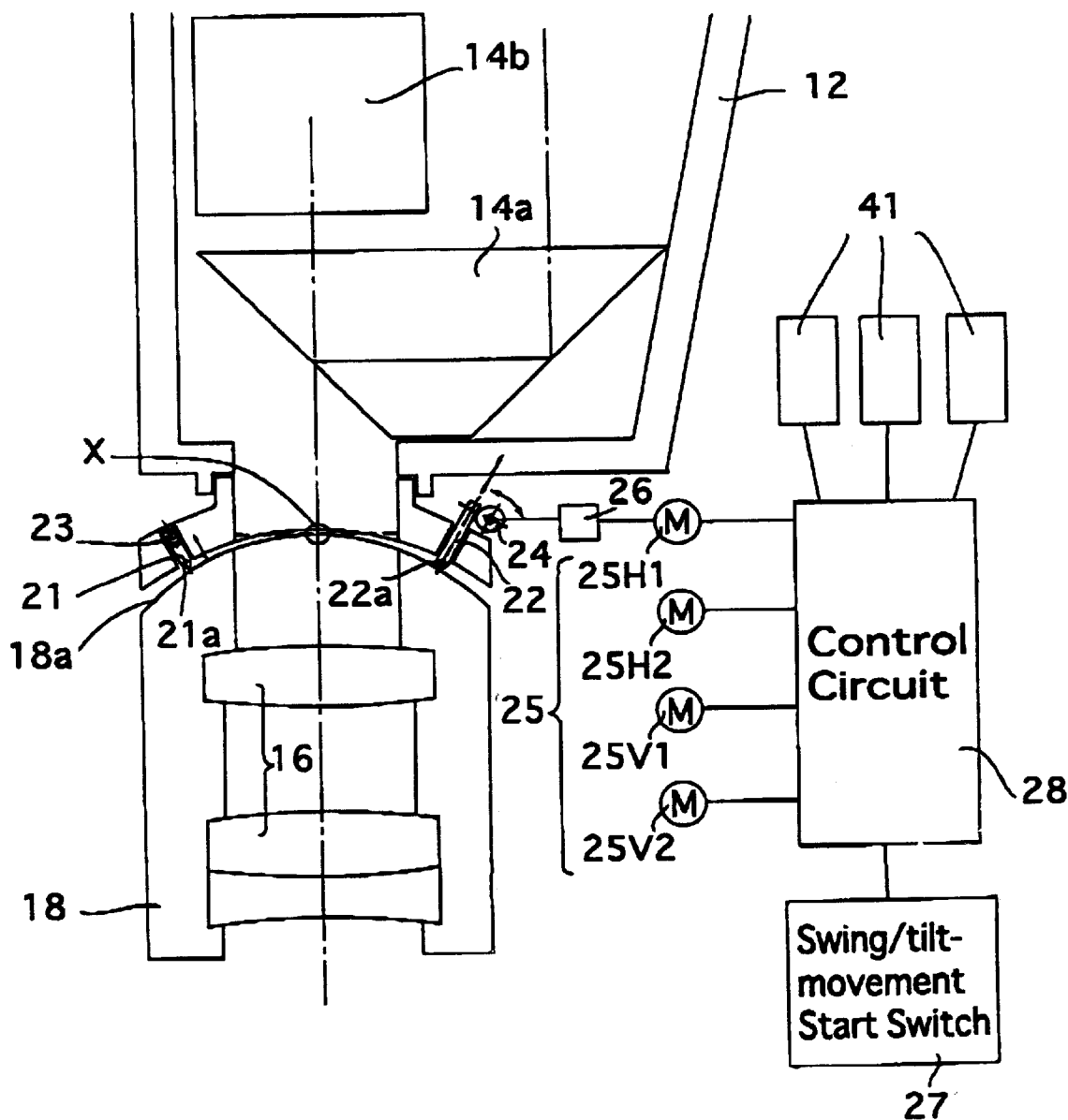
FIG. 2 is a transverse sectional view of fundamental components of the binocular shown in FIG. 1, showing the right eyepiece of the binocular, peripheral part thereof and an associated circuit.
Figure 3:
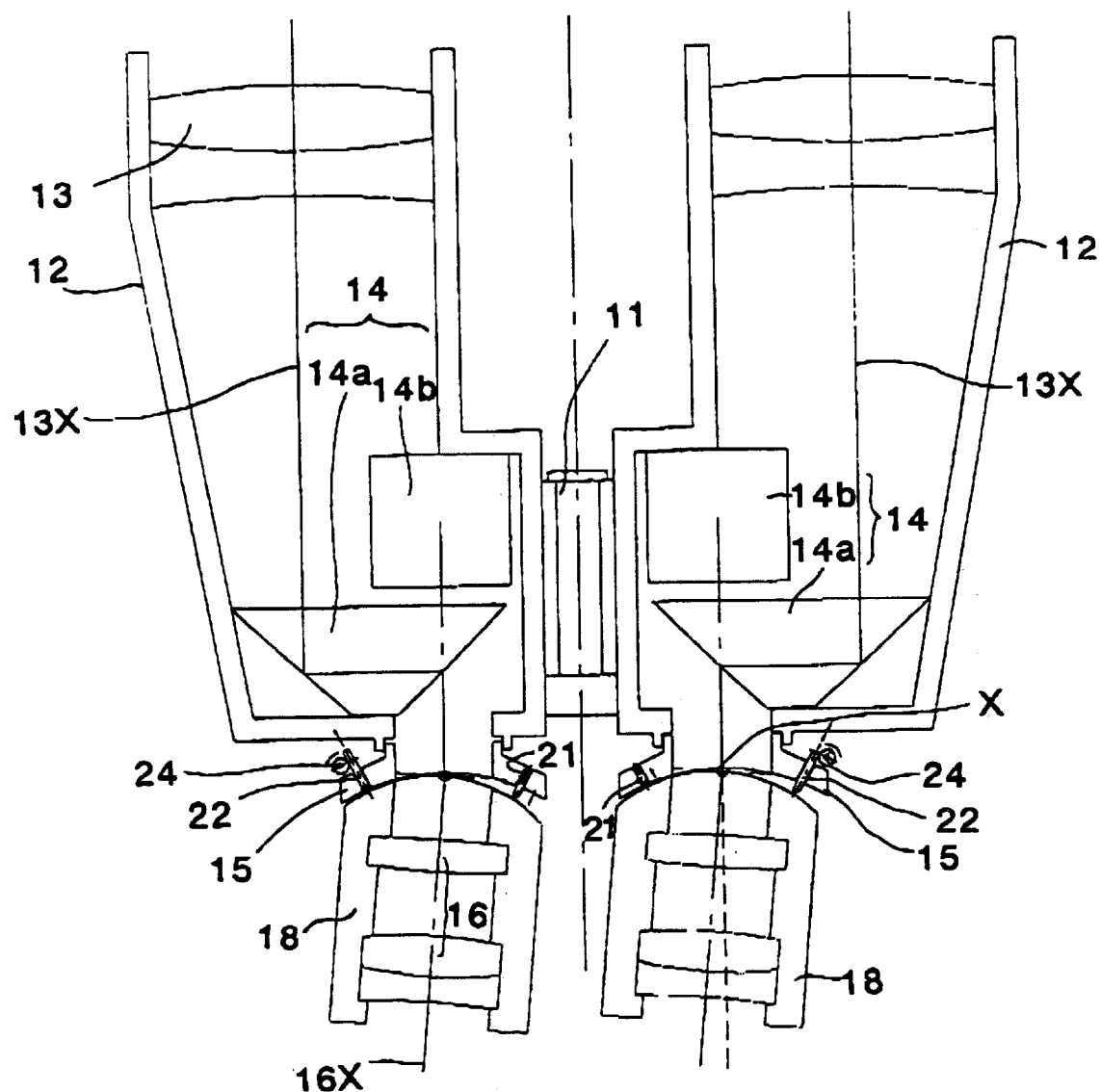
FIG. 3 is a transverse sectional view of the binocular shown in FIG. 1, showing a state where each of the right and left eyepieces is swung.
Figure 4:
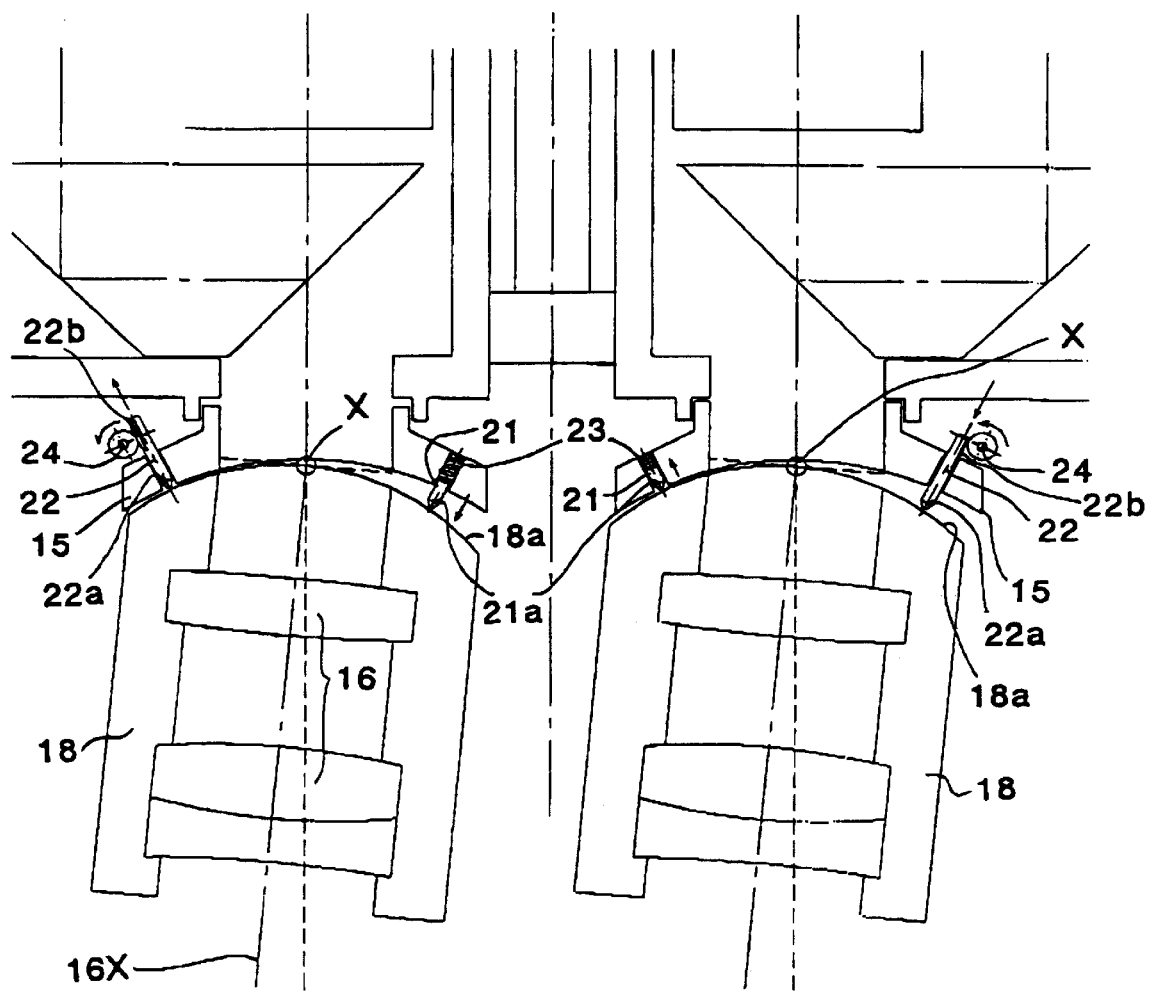
FIG. 4 is a transverse sectional view of fundamental components of the binocular shown in FIG. 1, showing the right and left eyepieces of the binocular and surrounding components thereof.

Each dish-shaped mount 15 is provided with a first pair of pins, i.e., a first follower pin 21 and a first drive pin 22 which are arranged on respective sides of the optical axis 16X of the eyepiece lens group 16 in a horizontal plane including the two optical axes 13X of the right and left objective lens groups 13. Each dish-shaped mount 15 is further provided with a second pair of pins, i.e., a second follower pin and a second drive pin which are identical to the first follower pin 21 and the first drive pin 22, respectively which are arranged on respective sides of the optical axis 16X of the eyepiece lens group 16 in a vertical plane extending perpendicular to the aforementioned horizontal plane. The second pair of pins are not shown. The pointed (or rounded) tip of each of the (first and second) follower pins and the (first and second) drive pins is in contact with a front spherical surface 18a of the corresponding eyepiece holder 18. Each follower pin 21 is pressed against the front spherical surface 18a by a helical compression spring 23 (FIG. 4) positioned in the dish-shaped mount 15. Each drive pin 22 is provided thereon, in a direction parallel to the axis thereof, with rack teeth 22b (FIG. 4). The rack teeth 22b are engaged with a corresponding pinion 24 which is driven by a corresponding motor 25 via a corresponding reduction mechanism (e.g., a reduction gear train) 26 which is schematically shown in FIG. 2.

Each of the right and left eyepiece holders 18 is always pressed against the corresponding dish-shaped mount 15 by a biasing system (not shown) so as not to be disconnected from the corresponding dish-shaped mount 15. Therefore, each helical compression spring 23 is always compressed. Accordingly, if a drive pin 22 is driven along the axis thereof in one direction to project from the dish-shaped mount 15 towards the front spherical surface 18a by the corresponding motor 25 via the corresponding reduction mechanism 26, a corresponding follower pin 21 retreats into the dish-shaped mount 15. Conversely, if a drive pin 22 is driven along the axis thereof in the opposite direction so as to retreat into the dish-shaped mount 15 by the corresponding motor 25 via the corresponding reduction mechanism 26, a corresponding follower pin 21 projects from the dish-shaped mount 15. If a follower pin 21 and a corresponding drive pin 22 move in such a manner, the corresponding eyepiece holder 18 swings or tilts in a plane which includes the follower pin 21 and the corresponding drive pin 22 with the front spherical surface 18a being constantly connected with the corresponding dish-shaped mount 15. The rotational center X of the eyepiece holder 18 is positioned on the optical axis 16X of the eyepiece lens group 16 at a focal plane 17f (see FIG. 5B) which is formed by the corresponding objective lens group 13 in an optical path between the Porro prism erecting system 14 and the eyepiece optical system 16. In each of the right and left viewing optical systems, an image plane 17, which is formed by the objective lens group 13, lies in the focal plane 17f extending perpendicular to the optical axis 13X of the objective lens group 13 when the eyepiece lens group, 16 is not rotated about the rotational center X at all (as shown in FIG. 5B).

The illustrated embodiment of the binocular is provided with two sets (one set for each of the horizontal and vertical directions) of six members (i.e., the follower pin 21, the drive pin 22, the compression spring 23, the pinion 24, the motor 25 and the reduction mechanism 26) to drive the right eyepiece holder 18 and another two sets of six members (i.e., the follower pin 21, the drive pin 22, the compression spring 23, the pinion 24, the motor 25 and the reduction mechanism 26) to drive the left eyepiece holder 18. Each abovementioned 'set' of six members constitutes an eyepiece adjusting device. Accordingly, the binocular is provided with four eyepiece adjusting devices in total. In each eyepiece holder 18, a first eyepiece adjusting device is adapted to swing the eyepiece holder 18 horizontally while a second eyepiece adjusting device is adapted to tilt the eyepiece holder 18 vertically. In FIG. 2, although all the four motors 25 (i.e., a first motor 25H1 for driving the right eyepiece holder 18 horizontally, a second motor 25H2 for driving the left eyepiece holder 18 horizontally, a third motor 25V1 for driving the right eyepiece holder 18 vertically, and a fourth motor 25V2 for driving the left eyepiece holder 18 vertically) are shown, the follower pins 21, the drive pins 22, the compression springs 23, the pinions 24 and the reduction mechanisms 26 which are associated with the second, third and fourth motors 25H2, 25V1 and 25V2 are not shown. The binocular is provided with a control circuit (controller) 28 and a swing/tilt-movement start switch 27. The first through fourth motors 25 (25H1, 25H2, 25V1 and 25V2) are controlled synchronously with one another by the control circuit 28 when the swing/tilt-movement start switch 27 is operated.

Figure 8:
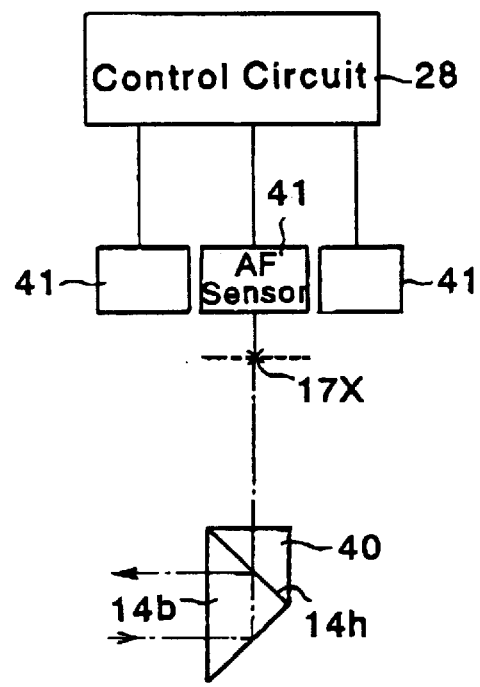
FIG. 8 is a side elevational view of one of the two prisms of the Porro prism erecting system shown in FIG. 7 and the AF sensors electrically connected to a control circuit.
Figure 7:
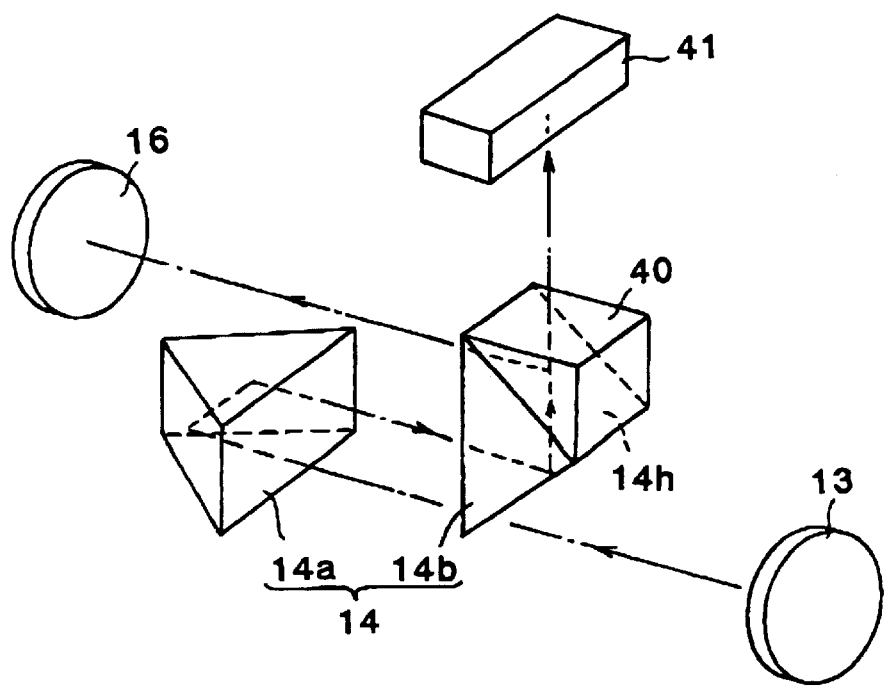
FIG. 7 is a schematic perspective view of a Porro prism erecting system and an AF sensor unit, showing a positional relationship thereof by way of example.

As shown in FIGS. 7 and 8, one of the reflecting surfaces of the porro prism 14b, which is one of the two right-angle prisms of the Porro-prism erecting system 14, is formed as a half-silvered surface 14h, and a beam dividing prism (a right-angle prism) 40 is adhered to the half-silvered surface 14h. The light which is incident on the half-silvered surface 14h is split into two light paths; one light path is reflected by the half-silvered surface 14h to proceed towards the eyepiece lens group 16, while the other light path passes through the half-silvered surface 14h and the beam dividing prism 40 to enter an AF sensor (detector) 41 which is positioned adjacent to the beam dividing prism 40.

Figure 10:
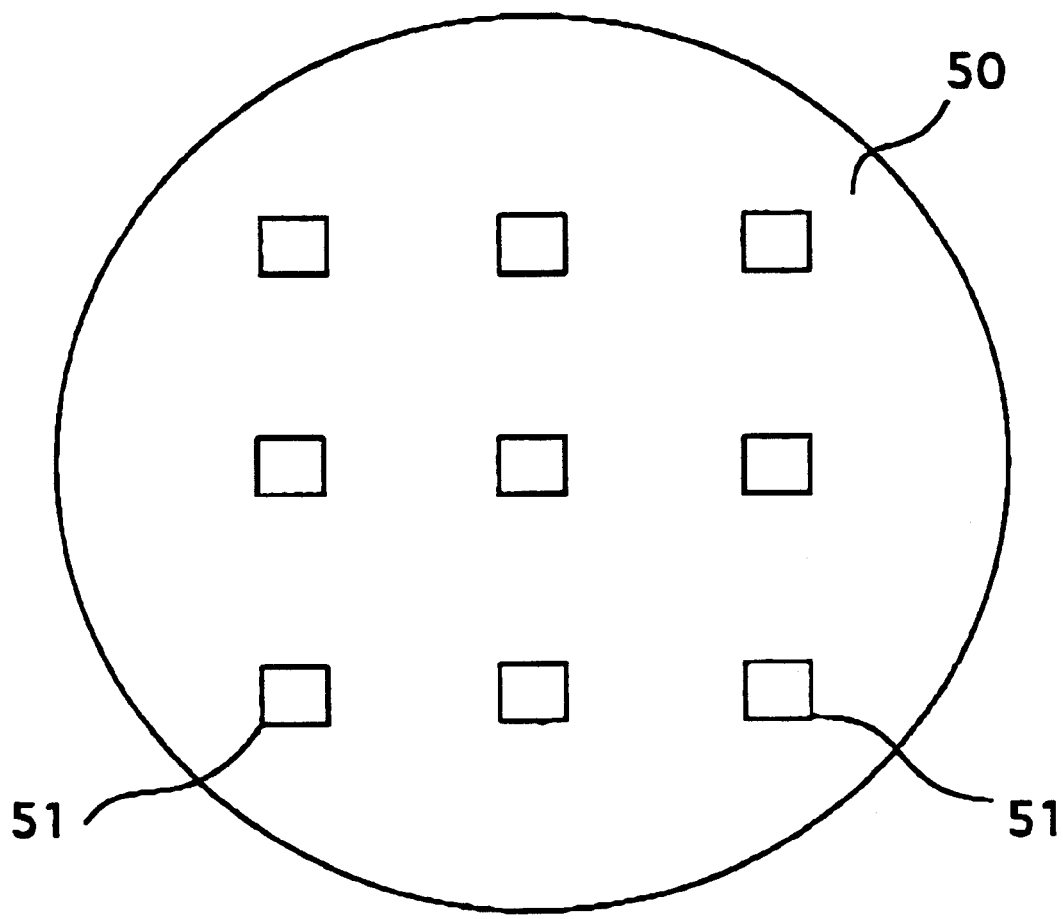
FIG. 10 is a plan view of the field of view of the binocular, showing an arrangement of a plurality of focus detection zones by way of example.

The AF sensor 41 is provided with nine focus detection zones 51 defined in a circular field of view 50 seen through the eyepiece lens groups 16 as shown in FIG. 10. Namely, in this embodiment, nine AF sensors 41 are positioned in the form of a 3×3 matrix to correspond to the arrangement of the nine focus detection zones 51. However, only three of the nine focus detection zones are shown in FIG. 8.

Each AF sensor 41 detects a focus state (amount of defocus) on an equivalent plane 17X (see FIG. 8) which is optically equivalent to the focal plane at the corresponding one of the nine focus detection zones 51. Each AF sensor 41 is a conventional AF sensor having a pair of line sensors (i.e., CCD line sensors) 41c (see FIG. 9) positioned in the vicinity of the equivalent plane 17X. Each AF sensor 41 produces an output, in the form of signals corresponding to the light received by the pair of line sensors 41c, to the control circuit 28.

Figure 9:
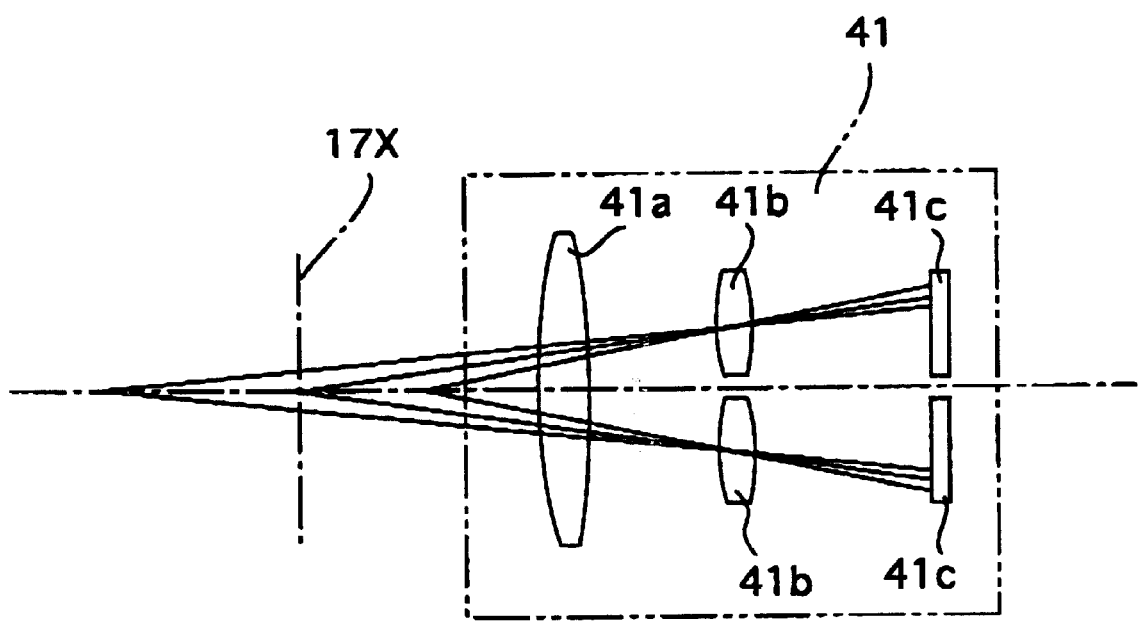
FIG. 9 is a schematic plan view of an embodiment of a AF sensor shown in FIG. 8, showing the internal structure thereof.

FIG. 9 shows an embodiment of a phase difference type AF sensor 21 which can be used as each AF sensor 41. In this AF sensor, the object image on the equivalent plane 17X is split by a condenser lens 41a and a pair of separator lenses (image forming lenses) 41b and is re-formed on a pair off line sensors 41c.

The position of object image incident upon the pair of CCD line sensors 41c varies depending on whether the image of the object image is accurately formed on the equivalent surface 17X (in-focus), is formed in front of the equivalent surface 17X (front focus), or is formed behind the equivalent surface 17X (rear focus). The amount of deviation from the focal point (defocus amount) can be judged from the position of an object image formed on the pair of line sensors 41c.

The line sensors 41c are each provided with a number of photoelectric transducers (light receiving elements) which convert the object image received thereby into electric charges which are lntegrated (accumulated). The integrated charges are successively output as AF sensor signals or data.

The output of each pair of line sensors 41c, positioned to correspond to one of the nine focus detection zones 51, is input to the control circuit 28. As shown in FIG. 10, the nine focus detection zones 51 are arranged in the form of a 3×3 matrix which corresponds to the arrangement of the nine AF sensors 41. Accordingly, the control circuit 28 can detect the inclination or angle of a surface of the sighting object which extends at an angle relative to the binocular axis (i.e., relative to a plane normal to the optical axis 13X of the objective lens group 13 of the binocular) in substantially any direction. It is possible for all of the nine focus detection zones 51 be used at one time, or at least three focus detection zones can be selectively used by the user.

Each objective lens group 13 can be driven along the optical axis 13X thereof by an AF mechanism. The structure of such an AF mechanism is well-known in the art and therefore will not be herein discussed.

In the first embodiment of the binocular, when the swing/tilt-movement start switch 27 is turned ON, the control circuit 28 detects (calculates) the inclination or angle of a surface of the sighting object which is orientated at an angle relative to the binocular (i.e., relative to a plane normal to the optical axis 13X of the objective lens group 13 of the binocular) in accordance with the output of at least three selected AF sensors 41. subsequently, in accordance with the result of the detection, the control circuit 28 synchronously drives each of the four motors 25 (25H1, 25H2, 25V1 and 25V2) forwardly or reversely to rotate each of the right and left eyepiece holders 18 about the corresponding rotational center X to deviate each optical axis 16X from the corresponding optical axis 13X of the objective lens group 13

(i.e., to bend each optical axis 16X at the corresponding rotational center X) so that an observer can observe the entire angled object clearly.

Figure 5A:
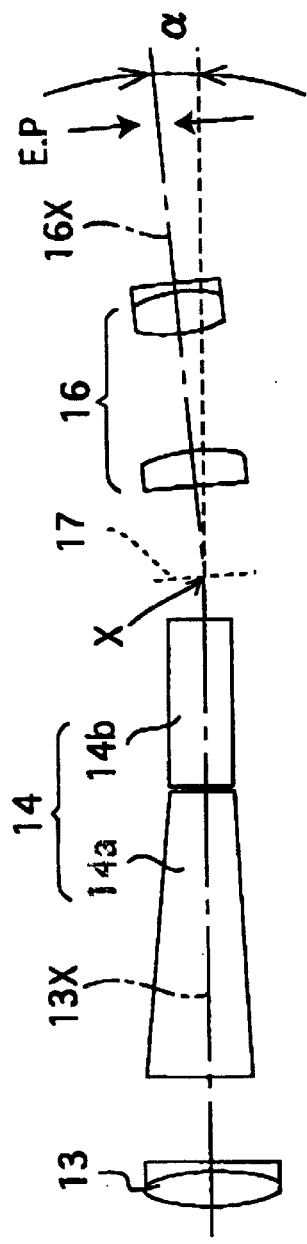
FIGS. 5A, 5B and 5C are developed views of the viewing optical system of the binocular shown in FIG. 1 in various rotational positions.
Figure 5B:
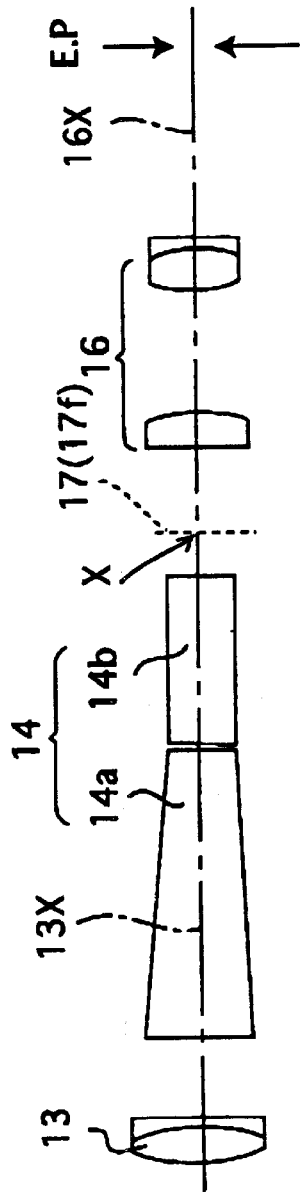
Figure 5C:
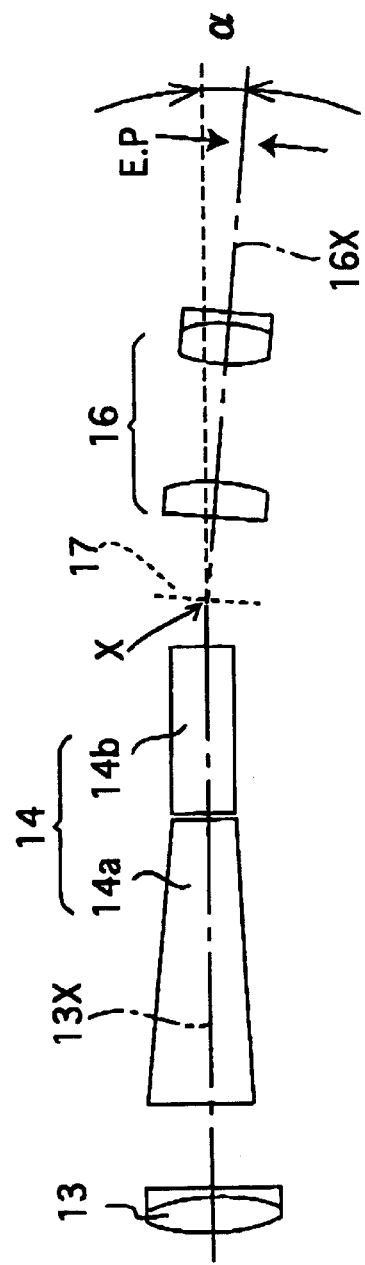

FIGS. 5A, 5B and 5C show the rotational movement of each eyepiece lens group 16 about the rotational center X. FIG. 5A shows a condition where the eyepiece lens group 16 is rotated about the rotational center X by an angle of α in a forward rotational direction; FIG. 5B shows a condition where the eyepiece lens group 16 is not rotated about the rotational center X at all, so that the optical axis 16X of the eyepiece lens group 16 is coincident with the optical axis 13X of the objective lens group 13; and FIG. 5C shows a condition where the eyepiece lens group 16 is rotated about the rotational center X by an angle of α in a reverse rotational direction. The state shown in FIG. 5B corresponds to the state of each of the viewing optical systems shown in FIG. 1 or 2. In this state shown in FIG. 5B, a surface of the sighting object which is to be observed extends perpendicular to the optical axis 13X, so that the image plane 17, which is formed by the objective lens group 13, extends perpendicular to the optical axis 13X. Therefore, in this state, all the points on the surface of the sighting object which is to be observed are brought into focus entirely on the focal plane, which extends perpendicular to the optical axis 13X. On the other hand, when a surface of an object which lies in a plane inclined relative to the optical axis 13X is observed, the image plane 17 formed by the objective lens group 13 is also inclined relative to the optical axis 13X as shown in FIG. 5A or 5C. In this case, the user can clearly observe the entire object surface by rotating the optical axis 16X of the eyepiece lens group 16 so that the optical axis 16X extends perpendicular to the inclined image plane 17. In each of FIGS. 5A, 5B and 5C, two opposing arrows "E.P" show the eye point.

Figure 6:
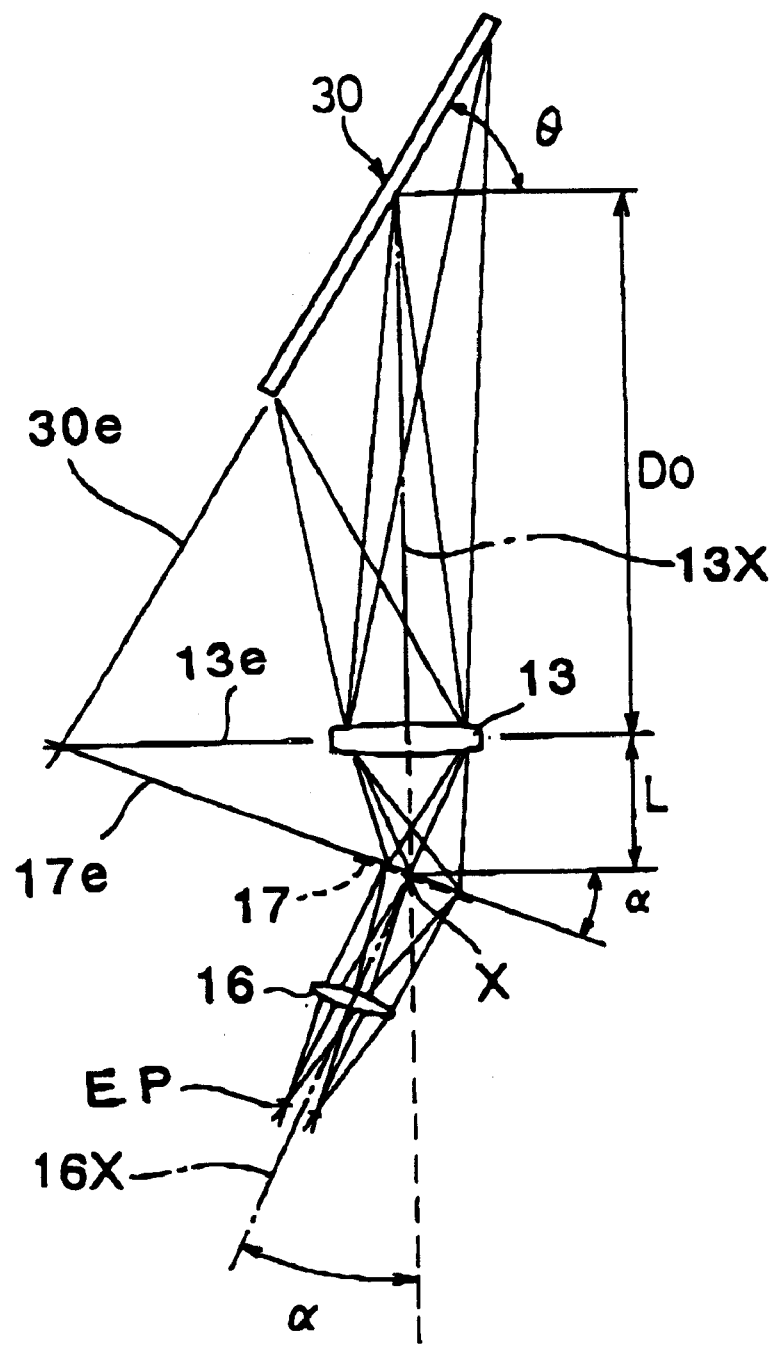
FIG. 6 is an explanatory view illustrating the Scheimpflug principle.

FIG. 6 is an explanatory view for illustrating the Scheimpflug principle. In the case where a plane surface (object surface) 30 extends obliquely relative to the optical axis 13X of the object lens group 13 (i.e., the plane surface 30 extends at an angle θ with respect to the optical axis 13X), an extended plane 30e of the plane surface 30, an extended plane 17e of the image plane 17 and a plane 13e, which passes through a principal point of the objective lens group 13 and extends perpendicular to the optical axis 13X, intersect one another at a common straight line. This is known as the Scheimpflug principle. According to the Scheimpflug principle, the plane surface 30 which is inclined to the optical axis 13X can be observed clearly by moving the eyepiece lens group 16 so that the optical axis 16X thereof extends perpendicular to the image plane 17. The optical axis 16X of the eyepiece lens group 16 can be made to extend perpendicular to an image on this image plane 17, so that the plane surface 30, which is inclined relative to the optical axis 13X of the objective lens group 13, can be entirely and clearly observed through the eyepiece lens group 16.

In the illustration shown in FIG. 6, the following equation is satisfied:

$$D0 \times \tan(90-\theta) = L \times \tan(90-\alpha)$$

wherein "D0" represents the object distance from a principal point of the objective lens group 13 to the plane surface 30; "θ" represents the angle formed between a plane which extends perpendicular to the optical axis 13X of the objective lens group 13 and the plane surface 30; "L" represents the distance from the principal point of the objective lens group 13 to the image plan 17 (the rotational center X); and "α" represents the angle formed between the image plane 17 and a plane extending perpendicular to the optical axis 13X.

Accordingly, in the case where a surface of the sighting object is inclined relative to the optical axis 13X, the image plane 17 inclined at an angle which satisfies the aforementioned equation will be formed.

The following are concrete values of the aforementioned "D0", "L", and "α" by way of example.

EXAMPLE 1

D0=2 m
θ=60
α=4.95 when L=100 mm

EXAMPLE 2

D0=2 m
θ=30
α=1.65 when L=100 mm

EXAMPLE 3

D0=1 m
θ=45
α=5.71 when L=100 mm

As can be understood from these specific values, even if the object distance D0 is in a range of one through two meters while the angle "θ" is in a range of thirty through sixty degrees, the plane surface 30 can be entirely observed as a sharp image by swinging or tilting the optical axis 16X of the eyepiece lens group 16 relative to the optical axis 13X of the objective lens group 13 by approximately two to six degrees.

The Scheimpflug principle is utilized for a conventional swing/tilt mechanism of a large camera (i.e., a camera utilizing a large-sized film). Swinging or tilting the back of the camera or the lens allows manipulation of depth of field and perspective photography. However, a very large image circle is required in the swing/tilt photography because the optical axis of the photographic lens deviates from the center of a film frame. A shift lens for 35 mm SLR cameras is utilized to control perspective of the image, e.g., to change a perspective view of a building to an isometric view of the building by shifting the lens in a direction of a film plane (i.e., in a direction perpendicular to the optical axis of the lens). In this case, however, such a shifting operation does not increase depth of field because the lens is merely moved in parallel, with respect to a plane normal to the optical axis thereof, so that the lens cannot be focused entirely on a surface which does not extend perpendicularly to the optical axis of the lens. Furthermore, the requirement of a very large image circle leads to an increase in the cost of production. Although depth of field can be increased by stopping down the diaphragm in a regular photographic operation, depth of field can be increased without stopping down the diaphragm by swinging or tilting the lens (by moving the lens about the rotational center X), hence, swing/tilt photography is advantageous with respect to the illuminance of an object image formed on an image plane. In regular viewing optical instruments, when providing the viewing optical system with the swing/tilt mechanism, in order to decrease the size of the viewing optical instrument and the cost of production, it is advantageous that the viewing optical system be provided with a swing/tilt mechanism in the eyepiece optical system, rather than in the objective optical system, because the eyepiece optical system is generally smaller in size than the objective optical system.

In order to bring objects located at different object distances into focus, the object lens group 13 only has to be moved along the optical axis thereof. Such a focusing mechanism is well-known in the art and can be constructed as an AF mechanism using output of the AF sensors 41.

Although the binocular in the first embodiment is constructed so that each eyepiece lens group 16 (the eyepiece holder 18) can be rotated about the rotational center X in any direction, the binocular may be constructed in a simple manner so that each eyepiece lens group 16 can be rotated about the rotational center X only in a horizontal plane. In this case, it is sufficient to provide the binocular with only three focus detection zones 51 and corresponding three AF sensors 41.

Figure 11:
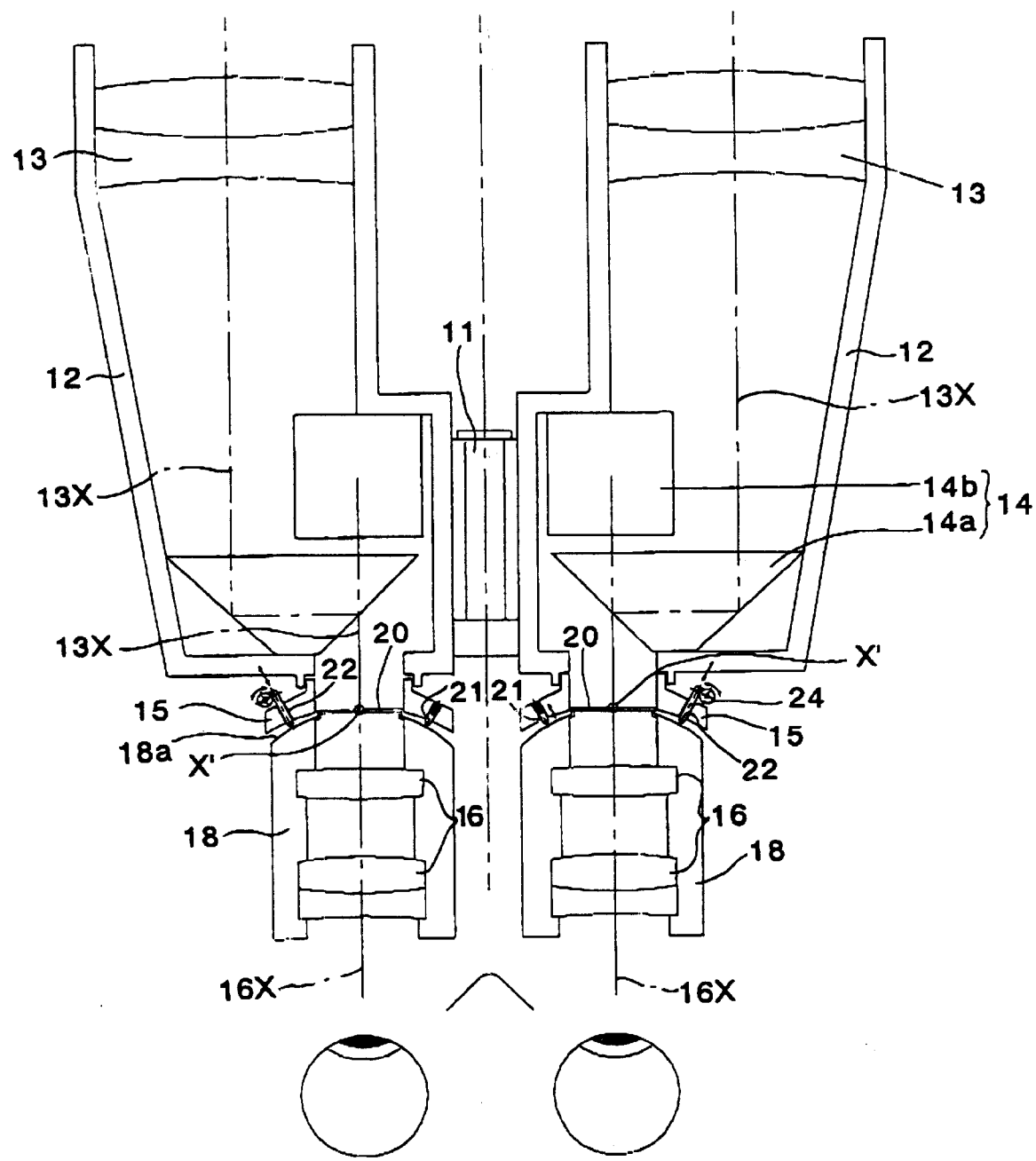
FIG. 11 is a transverse sectional view of the second embodiment of a binocular to which the present invention is applied.

FIGS. 11 through 16 show the second embodiment of Porro-prism type of binocular (viewing optical instrument) to which the present invention is applied. Elements which are substantially identical to those in the first embodiment are designated by the same reference numerals. As shown in FIG. 11, the binocular is provided with a generally bisymmetrical body having right and left tubular bodies 12 which are pivoted about a central shaft 11. The binocular is provided in each of the tubular bodies 12 with an objective lens group (objective optical system) 13 and a Porro-prism erecting system 14 which are fixedly positioned therein. The Porro-prism erecting system 14 includes two Porro prisms (two right-angle prisms) 14a and 14b. The optical axis 13X of each objective lens group 13 is bent behind the corresponding objective lens group 13 by a corresponding Porro-prism erecting system 14.

A dish-shaped mount 15 is connected to the rear end of each tubular body 12 so that the axis of the dish-shaped mount 15 is coincident with the axis of the objective lens group 13 behind the Porro-prism 14. An eyepiece holder 18 which holds an eyepiece lens group (eyepiece optical system) 16 and a diffusion plate 20 therein is connected to, and supported by, each of the right and left dish-shaped mounts 15. The diffusion plate 20 is a parallel plate, the front surface thereof is formed as a matte surface.

Figure 12:
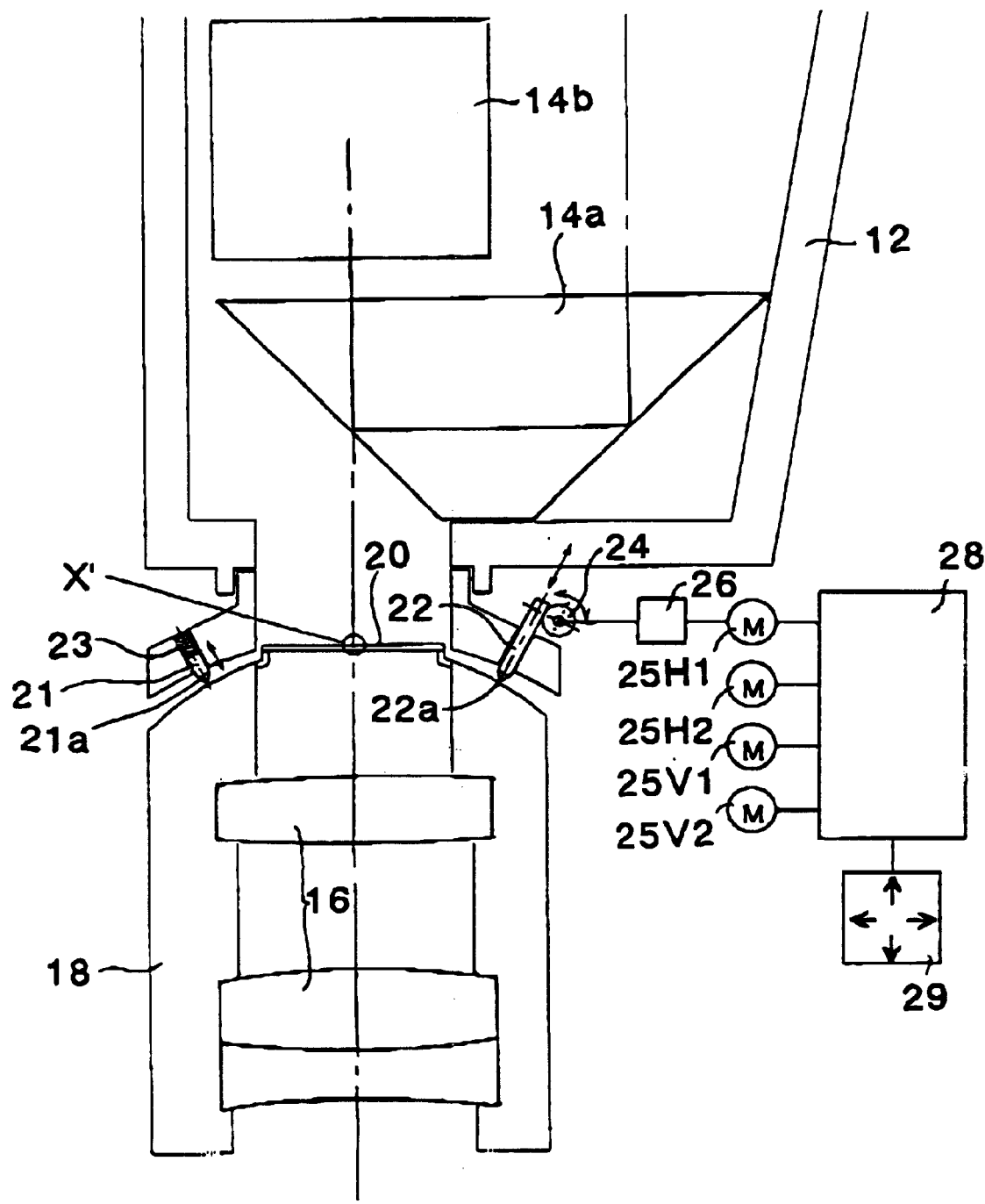
FIG. 12 is a transverse sectional view of fundamental components of the binocular shown in FIG. 11, showing the right eyepiece of the binocular, peripheral components thereof, and an associated circuit.
Figure 13:
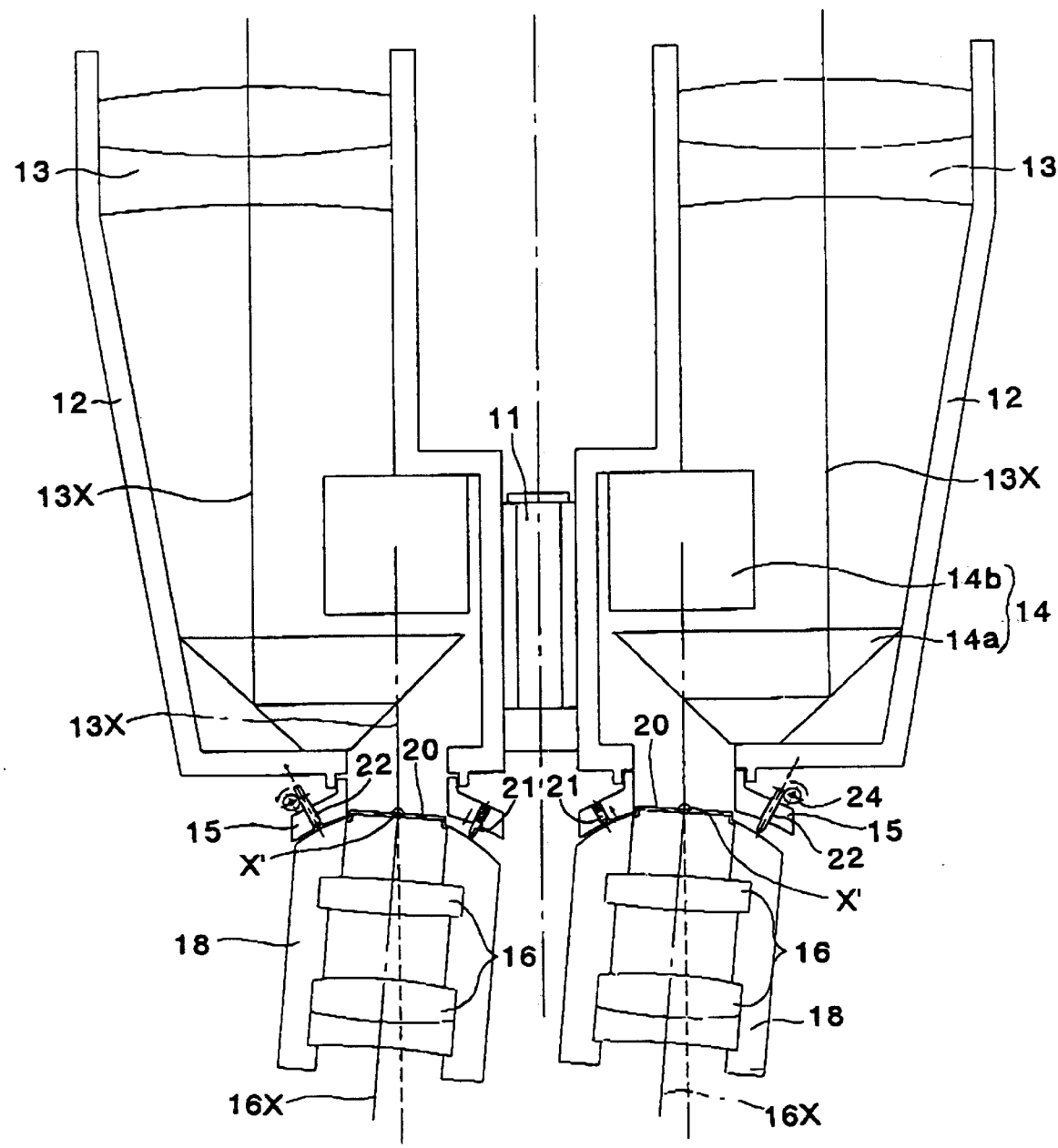
FIG. 13 is a transverse sectional view of the binocular shown in FIG. 11, showing a position where each of the right and left eyepieces are swung.
Figure 14:
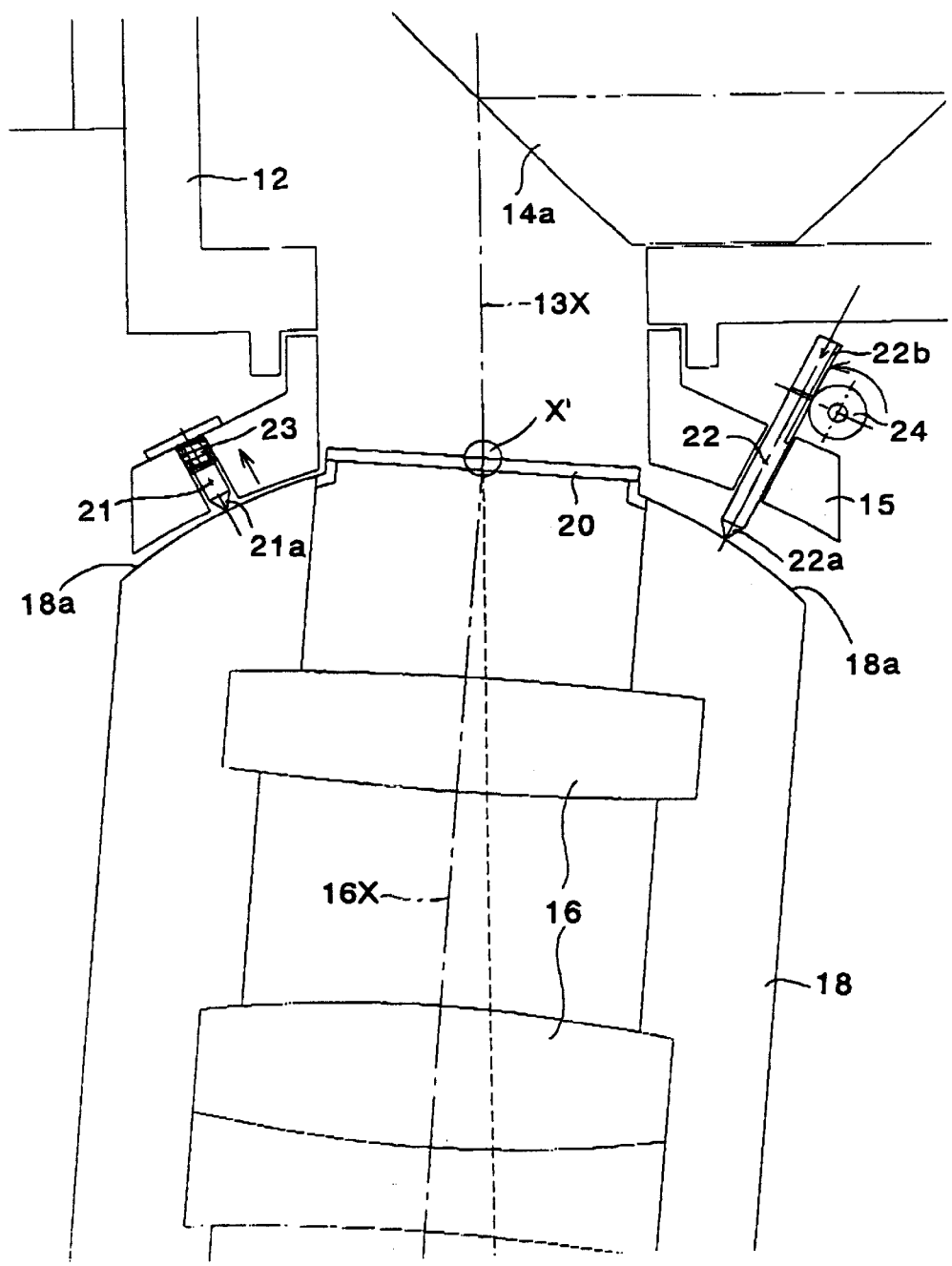
FIG. 14 is a transverse sectional view of fundamental components of the binocular shown in FIG. 11, showing the right eyepiece of the binocular and peripheral components thereof.

Each dish-shaped mount 15 is provided with a first pair of pins (i.e., a first follower pin 21 and a first drive pin 22) which are arranged on respective sides of the optical axis 16X of the eyepiece lens group 16 in a horizontal plane including the two optical axes 13X of the right and left objective lens groups 13. Each dish-shaped mount 15 is further provided with a second pair of pins (i.e., a second follower pin and a second drive pin which are identical to the first follower pin 21 and the first drive pin 22, respectively) which are arranged on respective sides of the optical axis 16X of the eyepiece lens group 16 in a vertical plane extending perpendicular to the aforementioned horizontal plane. The second pair of pins are not shown. The pointed (or rounded) tip of each of the (first and second) follower pins and the (first and second) drive pins is in contact with a front spherical surface 18a of the corresponding eyepiece holder 18. Each follower pin 21 is pressed against the front spherical surface 18a by a helical compression spring 23 positioned in the dish-shaped mount 15. Each drive pin 22 is provided thereon, in a direction parallel to the axis thereof with rack teeth 22b (see FIG. 14). The rack teeth 22b are engaged with a corresponding pinion 24 which is driven by a corresponding motor 25 via a corresponding reduction mechanism (e.g., a reduction gear train) 26 as illustrated in FIG. 12.

Each of the right and left eyepiece holders 18 is always pressed against the corresponding dish-shaped mount 15 by a biasing system (not shown) so as not to be disconnected from the corresponding dish-shaped mount 15, so that each helical compression spring 23 is always compressed. If a drive pin 22 is driven along the axis thereof in one direction to project from the dish-shaped mount 15 towards the front spherical surface 18a by the corresponding motor 25 via the corresponding reduction mechanism 26, a corresponding follower pin 21 retreats into the dish-shaped mount 15. Conversely, if a drive pin 22 is driven along the axis thereof in the opposite direction to retreat into the dish-shaped mount 15 by the corresponding motor 25 via the corresponding reduction mechanism 26, a corresponding follower pin 21 projects from the dish-shaped mount 15. If a follower pin 21 and a corresponding drive pin 22 move in such a manner, the corresponding eyepiece holder 18 swings or tilts in a plane which includes the pair of the follower pin 21 and the corresponding drive pin 22 with the front spherical surface 18a being constantly connected with the corresponding dish-shaped mount 15. The rotational center X' of the eyepiece holder 18 is positioned on the optical axis 16X of the eyepiece lens group 16 on the front surface (matte surface) of the diffusion plate 20 which is positioned on the side of the corresponding objective lens group 13.

Similar to the first embodiment of the binocular, the second embodiment of the binocular is provided with two sets (one set for each of the horizontal and vertical directions) of six members (i.e., the follower pin 21, the drive pin 22, the compression spring 23, the pinion 24, the motor 25 and the reduction mechanism 26) to drive the right eyepiece holder 18 and another two sets of six members (i.e., the follower pin 21, the drive pin 22, the compression spring 23, the pinion 24, the motor 25 and the reduction mechanism 26) to drive the left eyepiece holder 18. Each abovementioned 'set' of six members constitutes an eyepiece adjusting device. Accordingly, the binocular is provided with four eyepiece adjusting devices in total. In each eyepiece holder 18, a first eyepiece adjusting device is adapted to swing the eyepiece holder 18 horizontally while a second eyepiece adjusting device is adapted to tilt the eyepiece holder 18 vertically. In FIG. 12, although all the four motors 25 (i.e., a first motor 25H1 for driving the right eyepiece holder 18 horizontally, a second motor 25H2 for driving the left eyepiece holder 18 horizontally, a third motor 25V1 for driving the right eyepiece holder 18 vertically, and a fourth motor 25V2 for driving the left eyepiece holder 18 vertically) are shown, the follower pins 21, the drive pins 22, the compression springs 23, the pinions 24 and the reduction mechanisms 26 which are associated with the second, third and fourth motors 25H2, 25V1 and 25V2 are not shown. The first through fourth motors 25 (25H1, 25H2, 25V1 and 25V2) are controlled synchronously with one another by a control circuit (controller) 28 when a four-direction operational switch (all-direction operational switch) 29 provided on the binocular is operated.

In each eyepiece holder 18, the eyepiece lens group 16 and the diffusion plate 20 are fixed to the eyepiece holder 18. Each dish-shaped mount 15 and the corresponding eyepiece holder 18 are movable along the optical axis 13X with respect to the corresponding tubular body 12 so that an object image can be observed by bringing the matte surface of the diffusion plate 20 to a focal point of the object image which is formed by the objective lens group 13 and whose position varies depending on the object distance. Each dish-shaped mount 15 and the corresponding eyepiece holder 18 can be moved manually or electrically to bring the sighting object into focus.

By operating the four-direction operational switch 29 through the control circuit 28, each of the four motors 25 (25H1, 25H2, 25V1 and 25V2) is driven forwardly or reversely to rotate each of the right and left eyepiece holders 18 about the corresponding rotational center X' to vary the position of each optical axis 16X from the corresponding optical axis 13X of the objective lens group 13 (i.e., to bend each optical axis 16X at the corresponding rotational center X') so that an observer can observe the angled object clearly.

FIGS. 15A, 15B and 15C show the rotational movement of each eyepiece lens group 16 about the rotational center X'. FIG. 15A shows a state where the eyepiece lens group 16 is rotated about the rotational center X' by an angle of a in a forward rotational direction; FIG. 5B shows a state where the eyepiece lens group 16 is not rotated about the rotational center X' at all, so that the optical axis 16X of the eyepiece lens group 16 is coincident with the optical axis 13X of the objective lens group 13X; and FIG. 5C shows a state where the eyepiece lens group 16 is rotated about the rotational center X' by an angle of α in a reverse rotational direction. The state shown in FIG. 5B corresponds to the state of each of the viewing optical systems shown in FIG. 11 or 12. In the state shown in FIG. 15B, the diffusion plate 20 extends perpendicular to the optical axis 13X, so that all the points on a plane which extend perpendicular to the optical axis 13X can be brought into focus entirely on the diffusion plate 20. In the case where a surface of the sighting object which is to be observed is inclined relative to the optical axis 13x, the image plane, which is formed by the objective lens group 13, is also inclined relative to the optical axis 13X. In this case, as shown in FIG. 15A or 15C, the diffusion plate 20 is swung or tilted to lie on the inclined focal plane so that the user can clearly observes an image formed on the diffusion plate 20. In each of FIGS. 15A, 15B and 15C, two opposing arrows designated as "E.P" show the eye point.

Figure 16:
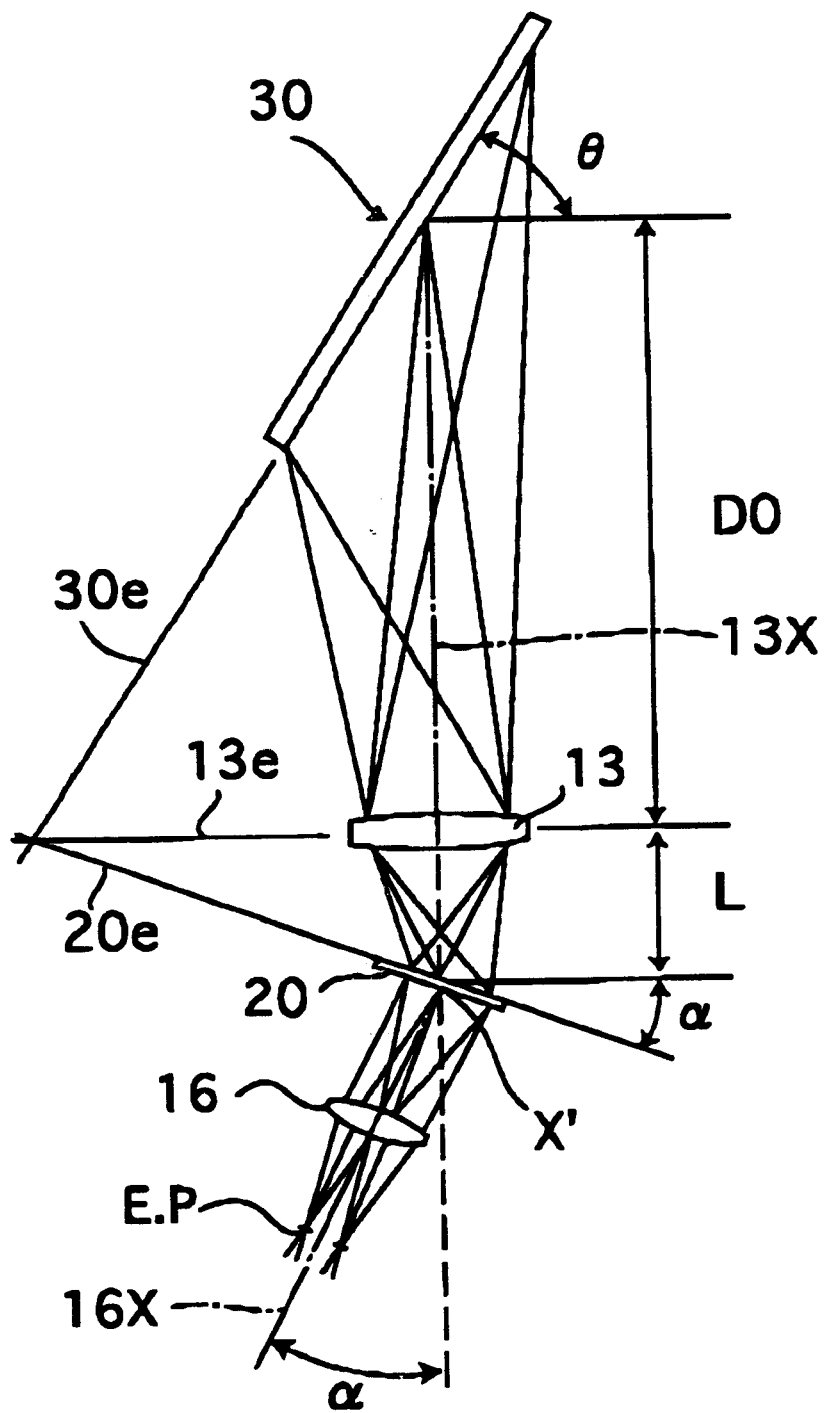
FIG. 16 is an explanatory view for illustrating the Scheimpflug principle.

FIG. 16 is an explanatory view for illustrating the Scheimpflug principle. According to the Scheimpflug principle, in order to bring all the points on a plane surface (object surface) 30 which extends obliquely relative to a plane normal to the optical axis 13X into focus on the diffusion plate 20, an extended plane 30e of the plane surface 30, an extended plane 20e of the diffusion plane 20 and a plane 13e, which passes through a principal point of the objective lens group 13 and extends perpendicular to the optical axis 13X, need to intersect one another at a common straight line. The plane surface 30 which is inclined with respect, to the optical axis 13X can be brought into focus by swinging or tilting the diffusion plate 20 and the eyepiece lens group 13 together about the rotational center X' so that the extended plane 30e, the extended plane 20e and the plane 13e intersect one another at a common straight line. The image on the image plane 17, i.e., on the diffusion plane 20, is magnified by the eyepiece lens group 16, whose the optical axis 16X extends perpendicular to the diffusion plane 20, so that the plane surface 30, which is inclined relative to the optical axis 13X of the objective lens group 13, can be entirely and clearly observed through the eyepiece lens group 16. Note that the discussion of the Scheimpflug principle in the first embodiment with reference to FIG. 6 is the same as that in the second embodiment with reference to FIG. 16 except that the binocular in the second embodiment is provided, in each eyepiece holder 18, with the diffusion plate 20 while the binocular of the first embodiment is not provided, in each eyepiece holder 18, with a diffusion plate.

In the second embodiment, since the diffusion plate 20 and the eyepiece lens group 13 can be swung or tilted about the rotational center X' where the optical axis 13X intersects the diffusion plate 20, swing/tilt operation can be performed regardless of the size of the image circle (i.e., regardless of the quantity of brightness of the edge of image field. Specifically even if the Porro-prism erecting system 14 is positioned between the objective lens group 13 and the diffusion plate 20, swing/tilt operation can be performed without concern about vignetting caused by the Porro-prism erecting system 14. In a typical binocular, the size of each of the right and left erecting systems is designed to be minimal, i.e., the size thereof is just adequate to allow a bundle of rays to pass therethrough when a lens has not been swung or tilted. Accordingly, there is a possibility of vignetting occurring which would darken a peripheral part of the field of view or render the peripheral part not visible at all if the object lens group or the eyepiece lens group is swung or tilted. However, by swinging or tilting the eyepiece optical system together with the diffusion plate 20 about the rotational center X' such a problem does not occur.

In order to bring objects located at different object distances into focus, the right and left eyepiece holders 18 only need to be moved relative to the right and left tubular bodies 12 so as to vary the positions of the right and left eyepiece lens groups 16 and the diffusion plates 20 relative to the objective lens groups 13 (the Porro-prism erecting systems 14), respectively.

Although the binocular in the second embodiment is constructed so that each eyepiece lens group 16 (the eyepiece holder 18) can be rotated about the rotational center X' in any direction, the binocular may be constructed in a simple manner so that each eyepiece lens group 16 can be rotated about the rotational center X' one of a horizontal and vertical plane.

The present invention can be applied not only to a binocular but also to any other viewing optical instrument e.g., a monocular) which is provided with a objective optical system and an eyepiece optical system.

As can be understood from the foregoing, according to the present invention, a viewing optical instrument in which the eyepiece can be focused entirely on a plane which is not normal to the optical axis of the objective optical system can be obtained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A viewing optical instrument having an objective optical system and an eyepiece optical system, an object image formed through said objective optical system being magnified and observed through said eyepiece optical system, said viewing optical instrument comprising:

an eyepiece adjusting device which enables said eyepiece optical system to rotate relative to said objective optical system about a rotational axis at which an optical axis of said objective optical system intersects a focal plane formed by said objective optical system;

a detector which detects an inclination of a surface of a sighting object relative to a plane which is normal to the optical axis of said objective optical system; and a controller that controls said eyepiece optical system to rotate about said rotational center in accordance with said inclination detected by said detector.

2. The viewing optical instrument according to claim 1, wherein said detector comprises at least three AF sensors which respectively correspond to at least three focus detection zones defined in a field of view of said eyepiece optical system.

3. The viewing optical instrument according to claim 1, wherein said detector comprises at least four AF sensors which respectively correspond to at least four focus detection zones defined in a field of view of said eyepiece optical system, and wherein said detector detects said inclination in accordance with signals output from three of said at least four AF sensors which respectively correspond to three of said at least four focus detection zones, said three focus detection zones being optionally selected from said at least four focus detection zones.

4. The viewing optical instrument according to claim 1, wherein said controller controls said eyepiece optical system to rotate about said rotational axis according to the Scheimpflug principle, so that an optical axis of said eyepiece optical system is normal to an image plans which is inclined, according to the Scheimpflug principle, relative to a plane which is normal to said optical axis of said objective optical system.

5. The viewing optical instrument according to claim 1, further comprising:

a tubular body which accommodates said objective optical system;

an eyepiece holder which accommodates said eyepiece optical system; and a mount connected to a rear end of said tubular body to be positioned between said tubular body and said eyepiece holder, so that an axis of said mount is coincident with an optical axis of said eyepiece optical system;

wherein said mount comprises a concave face at the rear end; and wherein said eyepiece holder is connected to said concave face of said mount so that said eyepiece holder can be at least one of swung and tilted relative to said tubular body.

6. The viewing optical instrument according to claim 5, wherein said eyepiece holder comprises a spherical surface at a front end of said eyepiece holder, said spherical surface being connected to said concave face of said mount.

7. The viewing optical instrument according to claim 1, further comprising an erecting optical system positioned between said objective optical system and said eyepiece optical system.

8. The viewing optical instrument according to claim 1, wherein said viewing optical instrument is a binocular.

9. A viewing optical instrument having an objective optical system and an eyepiece optical system, an object image formed through said objective optical system being magnified and observed through said eyepiece optical system, said viewing optical instrument comprising:

a diffusion plate positioned on a focal plane formed by said objective optical system; and an eyepiece adjusting device which enables said eyepiece optical system and said diffusion plate to rotate as a unit relative to said objective optical system about a rotational axis at which the optical axis of said objective optical system intersects a matte surface of said diffusion plate.

10. The viewing optical instrument according to claim 9, wherein the center of said diffusion plate lies on both the optical axis of said objective optical system and on the optical axis of said eyepiece optical system.

11. The viewing optical instrument according to claim 9, wherein said eyepiece optical system and said diffusion plate can be moved in a direction of the optical axis of said objective optical system.

12. The viewing optical instrument according to claim 9, further comprising a controller for controlling said eyepiece optical system to rotate about said rotational axis so that the matte surface of the diffusion plate coincides with an image plane which is inclined, according to the Scheimpflug principle, with respect to the optical axis of said objective optical system.

13. The viewing optical instrument according to claim 9, further comprising:

a tubular body which accommodates said objective optical system;

an eyepiece holder which accommodates said eyepiece optical system therein; and a mount connected to a rear end of said tubular body to be positioned between said tubular body and said eyepiece holder so that an axis of said mount is coincident with an optical axis of said eyepiece optical system;

wherein said mount comprises a concave face at the rear end thereof; and wherein said eyepiece holder is connected to said concave face of said mount so that said eyepiece holder can be at least one of swung and tilted relative to said tubular body.

14. The viewing optical instrument according to claim 13, wherein said eyepiece holder comprises a spherical surface at a front end of said eyepiece holder, said spherical surface being connected to said concave face of said mount.

15. The viewing optical instrument according to claim 9, further comprising an erecting optical system positioned between said objective optical system and said eyepiece optical system.

16. The viewing optical instrument according to claim 9, wherein said viewing optical instrument is a binocular.

* * * * *